J. P. BOWLING.
EXCAVATING MACHINE.
APPLICATION FILED APR. 21, 1915.

1,196,426.

Patented Aug. 29, 1916.
7 SHEETS—SHEET 2.

Witnesses
J. N. Lyles
R. P. Welburn

Inventor
James P. Bowling.
By C. L. Parker.
Attorney

J. P. BOWLING.
EXCAVATING MACHINE.
APPLICATION FILED APR. 21, 1915.

1,196,426.

Patented Aug. 29, 1916.
7 SHEETS—SHEET 6.

Witnesses
J. N. Lyles

Inventor
James P. Bowling,
C. L. Parker, Attorney

UNITED STATES PATENT OFFICE.

JAMES PARKER BOWLING, OF NEW ORLEANS, LOUISIANA.

EXCAVATING-MACHINE.

1,196,426. Specification of Letters Patent. Patented Aug. 29, 1916.

Application filed April 21, 1915. Serial No. 22,941.

*To all whom it may concern:*

Be it known that I, JAMES PARKER BOWLING, a citizen of the United States, residing at New Orleans, in the parish of Orleans and State of Louisiana, have invented certain new and useful Improvements in Excavating-Machines, of which the following is a specification.

My invention relates to improvements in an excavator or dredger, or a combined excavator and dredger, adapted for digging ditches, trenches, canals or the like, in marsh land, and for dredging harbors, bars, or rivers, while not necessarily restricted to such use.

An important object of the invention is to provide a machine of the above mentioned character, adapted to reduce the cost of excavating, dredging or the like, to the minimum, by accomplishing the work in an expeditious and continuous manner.

A further object of the invention is to provide a machine of the above mentioned character, having a movable or rotatable cutting member, with means to laterally shift it during the cutting movement thereof, whereby the cutting member is capable of digging a ditch or trench having a much greater width than the width or diameter of the cutting member.

A further object of the invention is to provide a machine of the above mentioned character, having means to properly cut through stumps or other obstructions.

A further object of the invention is to provide a machine of the above mentioned character, having means for conveying the cut or shaved mud, earth or the like, from proximity to the movable cutting member, without liability of the conveyer being clogged.

A further object of the invention is to provide a machine of the above mentioned character, which is reliable in operation, and convenient to control in such operation.

A further object of the invention is to provide novel and simple feed means to propel the machine as a whole, by positively engaging with the ground or mud over which the machine is passing.

Other objects and advantages of the invention will be apparent during the course of the following description.

In the accompanying drawings forming a part of this specification and in which like numerals are employed to designate like parts throughout the same, Fig. 3 is an enlarged central vertical longitudinal sectional view through the forward portion of the machine with the rear portion broken away.

In the drawings, wherein for the purpose of illustration is shown a preferred embodiment of my invention, attention being called more particularly to Figs. 1, 2, 3, and 4, the numeral 20 designates a main support or body portion of the machine, which is preferably in the form of a flat bottom boat, adapted to travel upon water or the mud in marsh lands. Arranged above the support or body portion 20 and preferably extending parallel with the longitudinal axis thereof, is a longitudinal main driving shaft 21 journaled through bearings 22 and 23 which are rigidly secured to a supporting frame 24, having depending legs 25, in turn rigidly secured to the support 20. At its rear end, the longitudinal driving shaft 21 is provided with a bevel gear 26, rigidly connected therewith and engaging a bevel gear 27, which is rigidly mounted upon a transverse shaft 28. This transverse shaft is journaled through bearings 29, attached to the supporting frame 24, as shown. The transverse shaft 28 has a sprocket wheel 30 rigidly mounted thereon, engaged by a sprocket chain 31, engaging a sprocket wheel 32, which is driven by a prime mover 33, such as an internal combustion engine, while a steam engine or the like may be employed.

Figure 5:
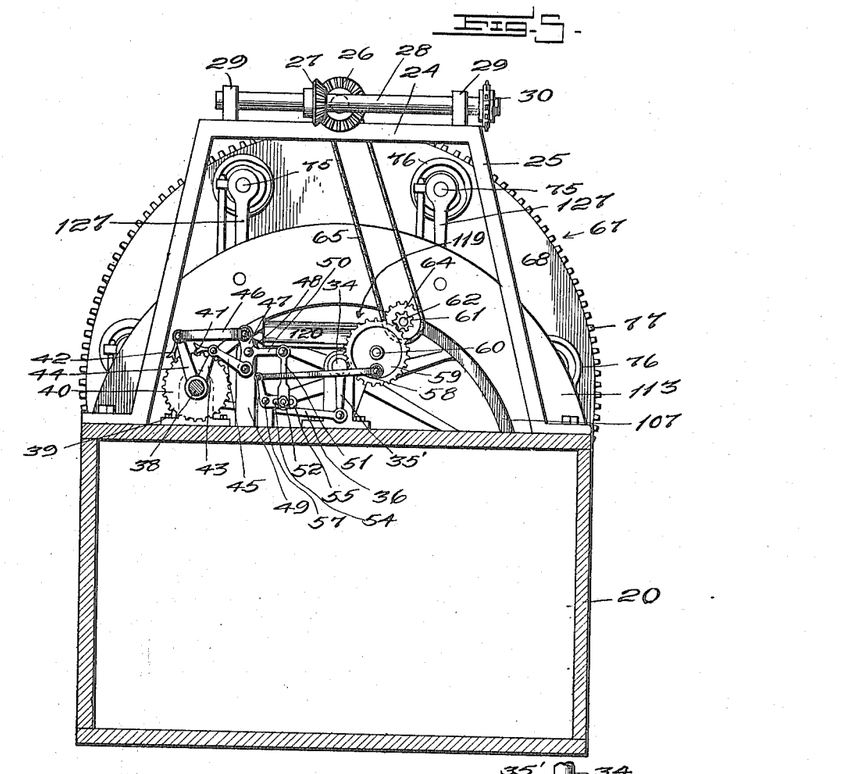
Fig. 5 is a transverse sectional view taken on line 5—5 of Fig 1.
Figure 6:
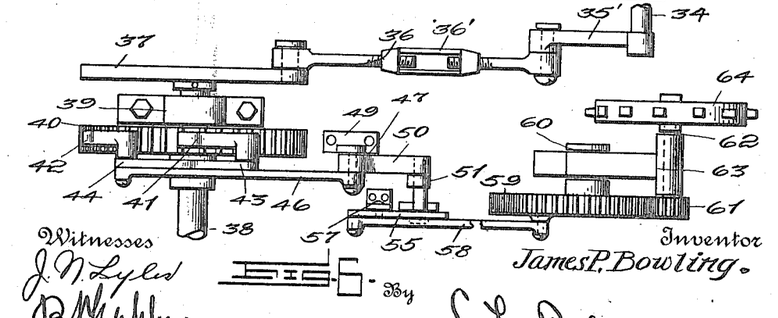
Fig. 6 is a plan view of driving means or gearing embodied in the invention.

The numeral 34 designates a rock-shaft or king-shaft which is preferably horizontal and arranged above the support 20 beneath the main longitudinal driving shaft 21, and preferably parallel therewith. The rock-shaft 34 is journaled through bearings 35, which are rigidly mounted upon the support 20. As more clearly shown in Figs. 1, 5 and 6, the rock-shaft 34 has a crank 35' rigidly connected with its rear end and depending therefrom. At its outer end, this crank has a pitman 36 pivotally connected therewith, extending transversely above the support 20, for pivotal connection with a crank disk or element 37. This pitman 36 embodies a turn-buckle 36' and is longitudinally extensible and contractible, whereby the crank 35' may be permanently adjusted in either direction with relation to the crank disk 37 whereby the rotatable cutting member may be made to oscillate a greater distance upon either side of the machine, as will be apparent. This crank disk or element is rigidly mounted upon the forward end of a longitudinally extending power transmitting shaft 38, as shown. This power transmitting shaft is journaled through bearings 39, suitably connected with the support 20. Rigidly connected with the power transmitting shaft 39 near and preferably rearwardly of the crank disk 37 is a toothed wheel 40, engaged by alternately operating preferably double ended pawls 41 and 42, pivotally connected with the upper ends of arms 43 and 44 respectively, the inner ends of which are pivotally mounted upon the shaft 38. The pawls 41 and 42 being double ended are adapted to be thrown in opposite directions to engage with the toothed wheel 40 for turning it in opposite directions in a step by step manner, as will be apparent. Pivotally connected with the upper on outer ends of the arms 43 and 44 are pitmen or links 45 and 46, having pivotal connection with the opposite ends of a lever 47, pivotally connected, as shown at 48, on a support 49. Rigidly connected with the lever 47 and preferably formed integral therewith is a crank-extension 50, disposed adjacent the pivot 48, and having pivotal connection at its outer end with a depending pitman 51, provided at its lower end with an aperture for receiving a pivot-element or bolt 52. This pivot element (see Fig. 16) has a ring or flange 53 rigidly mounted thereon and its opposite end extends through a longitudinal slot 54 in the horizontal arm of a bell crank lever 55, with a clamping nut 56 carried by its outer end, whereby the pivot-element 52 may be longitudinally adjusted upon the horizontal arm of the bell-crank lever and locked in adjustment at the desired vertical position. The function of this construction is to provide means to adjust the extent of movement of the toothed wheel 40 upon each step thereof. The bell-crank lever 55 is pivotally connected with a suitable support, as shown at 57. Pivotally connected with the vertical arm of this bell crank-lever 55 is a pitman 58, the opposite end of which has pivotal connection with a large gear or pinion 59, rotatably mounted upon a stationary stub-shaft 60. This gear or pinion 59 is engaged and driven by a smaller gear or pinion 61, rigidly mounted upon a stub-shaft 62, journaled through a stationary bearing 63. Rigidly connected with the opposite end of the stub-shaft 62 is a sprocket wheel 64, engaged by a sprocket chain 65, extending upwardly for engagement with a sprocket 66, rigidly mounted upon the rear end of the main longitudinal driving shaft 21, as shown. From the foregoing description it is obvious that the main driving shaft 21 is continuously rotated in the same direction, while the rock-shaft 34 is turned back and forth at a greatly reduced speed with respect to the shaft 21.

Figure 7:
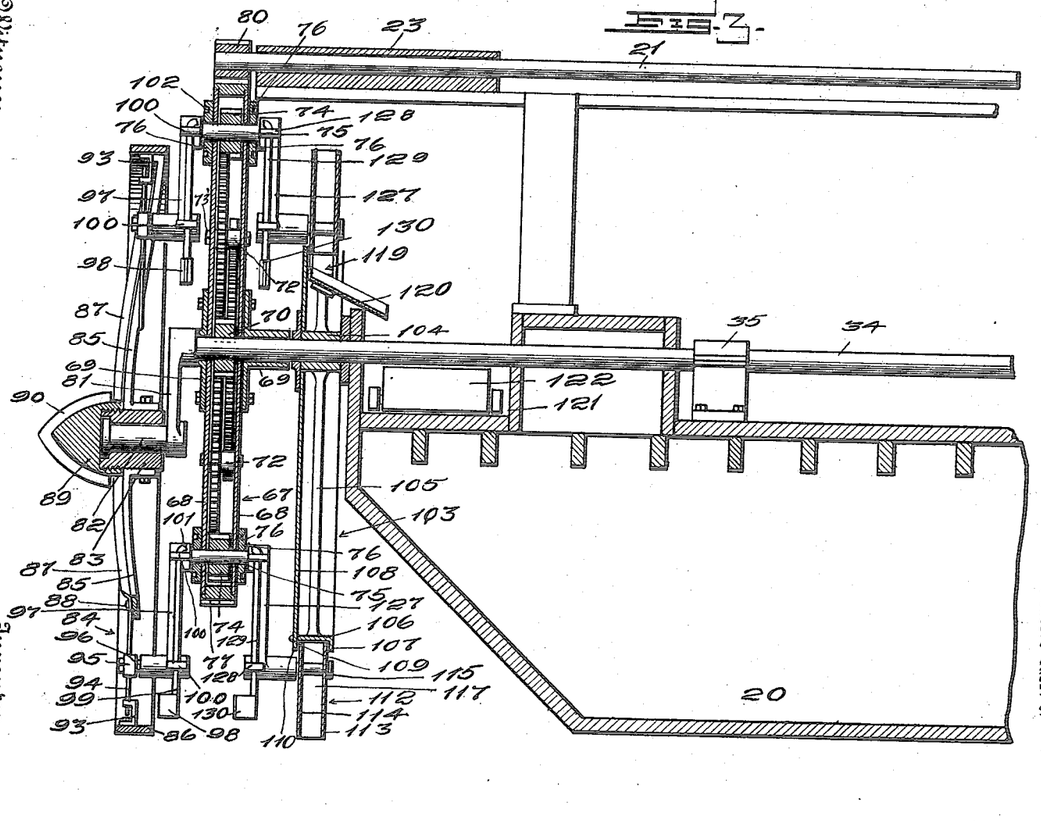
Fig. 7 is a front elevation of a planetary gear-carrier, the side plate being removed, to show the interior gears.

Rotatably mounted upon the forward end of the rock-shaft 34 (see Figs. 3 and 7) and concentric therewith, is a planetary gear-carrier, designated as a whole by the numeral 67. This planetary gear-carrier embodies end plates or heads 68, having hubs 69, rigidly attached thereto and rotatable upon the rock-shaft 34. The numeral 70 designates a sun pinion or gear, keyed or otherwise rigidly secured to the rock-shaft 34 and arranged centrally within the planetary gear-carrier 67. Arranged to engage with the sun gear 70 are inner large planetary gears or pinions 71, rotatably mounted upon sleeve 72, carried by transverse stub-shafts 73, extending through apertures in the heads 68, and carrying nuts 73' engaging with the outer sides thereof, for clamping or locking the heads together. Engaging the inner large planetary gears 71 are outer small planetary gears 74, rigidly mounted upon transverse shafts 75, rotatably mounted within bearings 76, rigidly secured to the outer sides of the heads 68, the shafts 75 extending exteriorly of the planetary gear-carrier 67, upon opposite sides thereof for a substantial distance, for a purpose to be described. The pinions or gears 74 are of the same diameter as the sun gear 70. I wish it understood that the invention is in no sense restricted to the precise number and arrangement of the planetary gears, as the number may be varied, as may be found advantageous. The arrangement of planetary gears 71 and 74, as more clearly illustrated in Fig. 7, is found to be advantageous in machines constructed to do heavy work, as such arrangement is very strong and durable. It is also to be understood that the invention is not restricted to the precise form of gears interposed between the sun gear and the outer planetary gears 74 as it is obvious that other gearing could be substituted and the same result obtained. The planetary gear-carrier 67 also includes an outer main gear 77, preferably formed in sections 78, disposed between the outer edges of the heads 68 and bolted or otherwise rigidly attached thereto, as shown at 79. The function of forming this main gear in sections is to provide means whereby portions thereof, which have become stripped, may be removed and repaired or a new portion substituted therefor without disturbing the other portions of the annular gear. This main gear 71 is engaged and driven by a small gear 80, rigidly mounted upon the forward end of the main driving shaft 21, as more clearly illustrated in Figs. 1 and 3.

Figure 4:
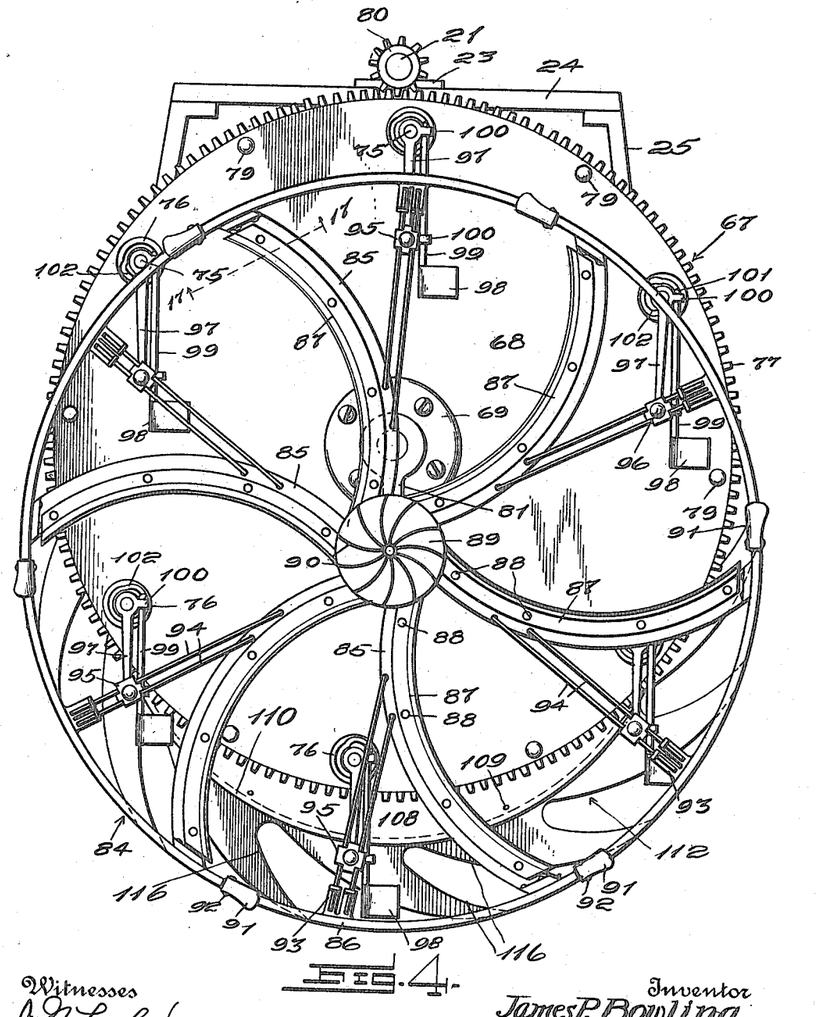
Fig. 4 is a front end elevation of the machine.

As more clearly shown in Figs. 3, and 4, a depending crank 81 is rigidly mounted upon the forward end of the rock-shaft 34 and has a wrist pin or pivot element 82 rigidly connected with its lower end. Rotatably mounted upon the pivot element 82 is a hub 83 of a forward substantially vertical rotatably cutting element or wheel, designated as a whole by the numeral 84. This rotatable cutting element includes preferably curved spokes 85 rigidly connected with the hub 83 and with a rim 86. Rigidly secured to the forward sides of these curved spokes 85 are curved blades 87, preferably detachably connected therewith by means of bolts 88 or the like, whereby they may be removed when broken or damaged for the purpose of repair, sharpening or the like. The inner ends of these curved blades 87 terminate adjacent the hub 83, and are preferably covered by a cap 89, preferably having screw-threaded engagement with the hub 83, such cap being provided upon its outer surface with spiral blades 90. The function of this cap is to protect the inner ends of the blades 87, preventing them from being broken and also to prevent dirt from entering the space between the pivot element 82 and hub 83. The outer ends of the blades 87 are protected by outer blades 91, which are approximately U-shaped in horizontal cross-section, as shown in Fig. 18, to straddle the rim 86, with a portion thereof fitting in a notch 91' in the rim. Each outer blade is rigidly held in place by a bolt 92 or the like. The outer blades 91 straddle the rim 86, thus constituting exterior and interior cutting means, and forming in effect a continuation of the blades 87, and serving to protect them.

The rim 86 is provided with pairs of inwardly extending apertured knuckles or members 93, slidably receiving pairs of radially disposed rods 94, having their inner ends rigidly connected with the curved spokes 85, as shown. These rods 94 are preferably formed of suitably stiff and resilient spring steel, thus taking up any undue shocks or jars which might be transmitted to the rotatable cutting element, should the same encounter a very large obstruction. Slidably mounted upon the pairs of radially disposed rods 94 are cross-heads 95, carrying pins 96, having pivotal connection with the lower ends of depending cranks 97, which are rigidly mounted upon the outer ends of the stub-shafts 75. When the main depending crank 81 is in the normal vertical position, the auxiliary cranks 97 are substantially vertical or parallel therewith, and retain this parallel position with relation thereto, during the rotation of the planetary gear carrier 67 and the oscillation of the crank 81, which is of course effected by means of the sun gear 70 and associated planetary gears.

As the rotatable cutting element or wheel 84 shaves, or cuts into the material to be removed, such material passes rearwardly between the spokes thereof, in proximity to a take-up conveyer, to be hereinafter described. To aid this rearward movement of the material with respect to the rotatable cutting element 84, I preferably provide blades 98, (see Figs. 3, 12, and 13) rigidly mounted upon radial shafts 99, journaled through apertured knuckles 100, formed upon the cranks 97. The shafts 99 are provided at their inner ends with laterally extending cranks 101, operating within cam grooves 102, formed in the bearings 76. The cam grooves 102 are so constructed that the shafts 99 near the bottom of the rotatable cutting element 84, in Fig. 4, are turned to set the blades 98 at an angular position, but when the shafts are carried around to the top of the rotatable cutting element 84, in Fig. 4, the shafts 99 are turned to bring the blades 98 to a position parallel to the plane of rotation of the rotatable cutting element 84, whereby they can conveniently pass with the rotatable cutting element between it and the planetary gear carrier 67.

The numeral 103, designates an eccentric support-wheel (see Figs. 3 and 8) rigidly mounted upon the forward portion of the rock-shaft 34, rearwardly of the planetary gear-carrier 67. This eccentric support-wheel includes a hub 104, from which radiate spokes 105, carrying a circular rim 106, provided upon one edge thereof with an outstanding flange 107. A plate 108 is arranged upon the opposite side of the rim 106 and secured thereto by means of screws or bolts 109, as shown. The plate 108 extends radially beyond the rim 106 forming a flange 110, coöperating with the flange 107, providing an annular guide-way for an annular take-up conveyer, designated as a whole by the numeral 112. The annular take-up conveyer 112 comprises spaced rings 113 and 114, which are rigidly connected by means of bolts, pins, or the like. The outer forward ring 114 is provided with inclined openings 116, which are tapered and increase in width outwardly, as more clearly shown in Fig. 4. Arranged between the rings 113 and 114 are inclined curved strips 117, forming with the rings and the rim 106 a plurality of pockets or buckets 118, as more clearly shown in Fig. 8. These strips 117 are secured to the rings by any suitable means, such as bolts or rivets. These buckets 118 are so shaped that the material carried therein, shifts inwardly as the buckets rise, until they reach the hopper, for discharging the material thereto. The rim 106 has its upper portion cut away, as more clearly shown in Fig. 8, providing an opening 119, which leads into a rearwardly extending inclined hopper 120, rigidly attached to the support wheel 104, as shown. The support wheel 103 is stationary with relation to the annular conveyer, and its rim 106 serves to close the bottom of the buckets 118, such buckets having their bottoms uncovered or opened when they reach the opening 119, whereby they discharge into the hopper 120.

Figures 1, 15, 16, 17:
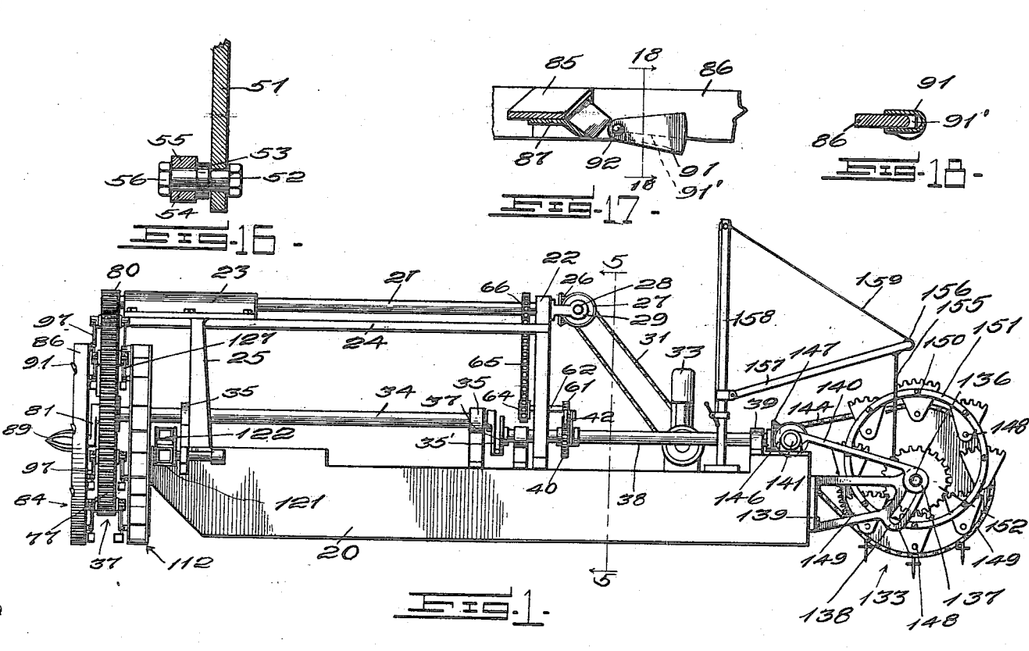
Figure 1 is a side elevation of a machine embodying my invention.
Fig. 15 is an edge elevation of the same.
Fig. 16 is an enlarged detail section through an adjustable pivot.
Fig. 17 is a detail section taken on line 17—17 of Fig. 4, and, Fig. 18 is a similar view taken on line 18—18 of Fig. 17.
Figures 2, 12, 13, 14, 15:
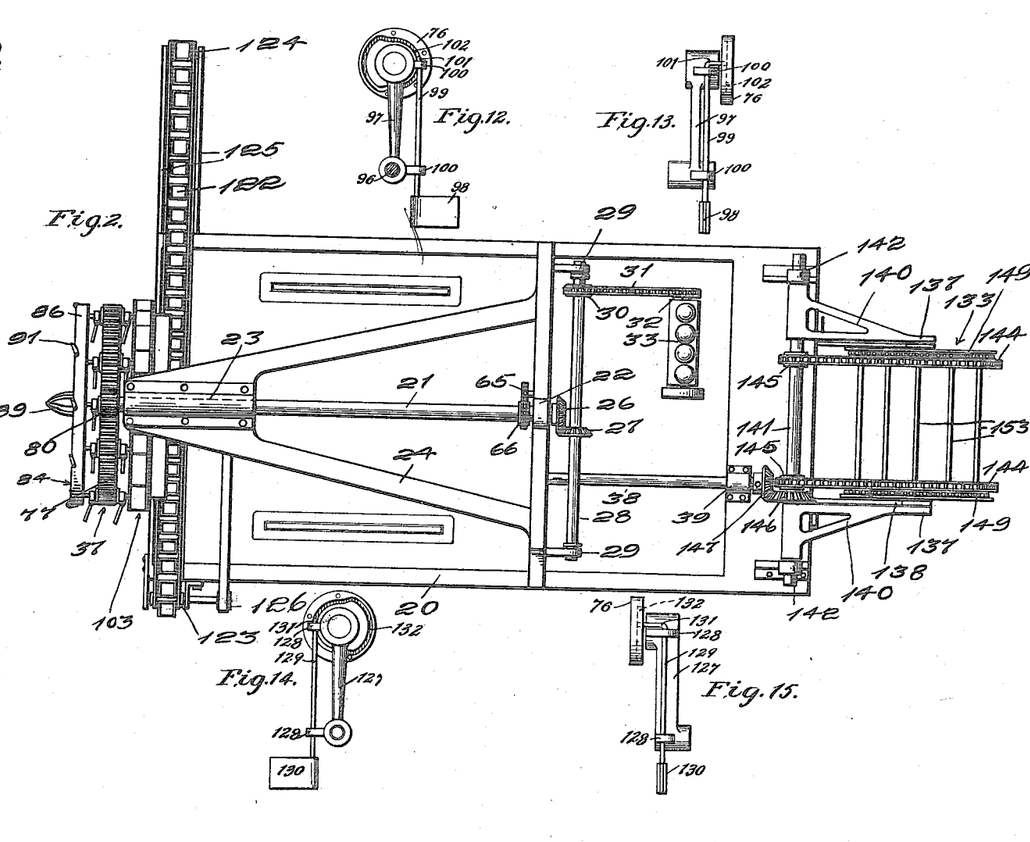
Fig. 2 is a plan view of the same.
Fig. 12 is a detail side elevation of a crank and associated elements.
Fig. 13 is an edge elevation of the same.
Fig. 14 is a side elevation of another crank and associated elements.
Figure 8:
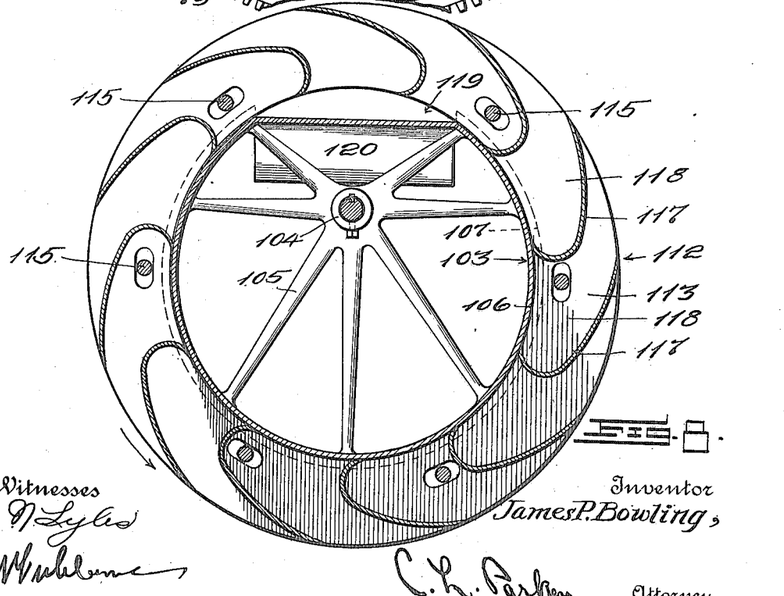
Fig. 8 is a central vertical transverse sectional view through a take-up conveyer.
Figures 9, 10, 11:
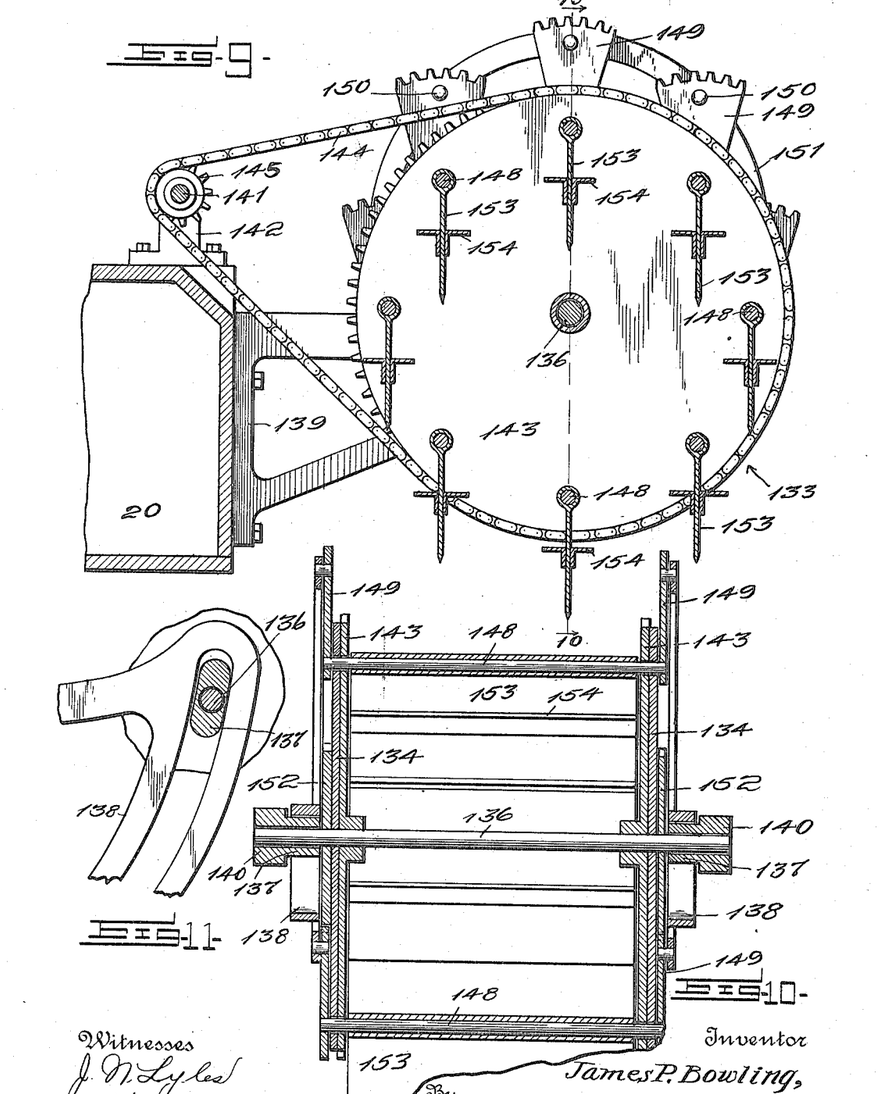
Fig. 9 is a central vertical longitudinal sectional view through the rear portion of the machine, the forward portion being broken away.
Fig. 10 is a transverse sectional view taken on line 10—10 of Fig. 9.
Fig. 11 is a detail view of a bearing and associated elements.

The rotatable take-up conveyer is rotated in the direction of the arrow, as indicated in Fig. 8, and the material which has been previously cut or loosened is gathered up in the pockets 118, carried upwardly and dumped through the opening 119 into the hopper 120, from which it falls downwardly and rearwardly into a transverse trough 121, clearly shown in Figs. 2 and 3. Operating within this trough is an endless conveyer 122 of any well known or preferred type, one end of which is passed about a pulley 123, secured to the support 20, while the opposite end of this conveyer operates about a pulley 124, secured to laterally extending beams 125, attached to the support 20. It is thus apparent that the material which the take-up conveyer elevates, passes through hopper 120 and is deposited upon the endless conveyer 122, in the trough 121, and is conducted thereby from proximity to the take-up conveyer.

Rigidly connected with the rear ends of the stub-shafts 75 (see Fig. 3) are depending cranks 127, parallel with the cranks 97. The lower ends of the cranks 127 are pivotally connected with the rings 113 and 114 by means of bolts 115, as shown. It is obvious that the rotatable take-up conveyer 112 is concentric with the rotatable cutting element 84, and rotates therewith and is adapted to be shifted laterally therewith, while remaining concentric therewith. The cranks 127 are provided with laterally extending knuckles 128 (see Figs. 3, 14 and 15) within which are pivotally mounted shafts 129, having blades 130 rigidly secured to their outer ends. At their inner ends these shafts carry laterally extending cranks 131, operating within cam grooves 132 formed in the rear bearings 76, as shown. These shafts 129 turn with the shafts 97 whereby the blades 130, when near the bottom of the rotatable cutting element, as shown in Fig. 4, are inclined rearwardly, but when moved to the top thereof, are parallel with the plane of rotation of the rotatable cutting element 84.

I will now proceed to describe the means for feeding or effecting the longitudinal travel of the machine, attention being called more particularly to Figs. 1, 2, 9, 10 and 11. Such means comprises a wheel frame designated as a whole by the numeral 133, including circular end members or plates 134, rotatably mounted upon a transverse shaft 136, journaled in bearings 137. These bearings 137 are vertically adjustably mounted in slotted guides 138, rigidly attached to the rear end of the support 20 by brackets 139. Rigidly connected with the bearings 137 are vertically swinging radius arms 140, having pivotal connection with a transverse shaft 141, journaled through bearings 142, rigidly mounted upon the rear end of the support 20. Arranged inwardly of the circular ends 134 are sprocket wheels 143, rigidly secured thereto and engaged by sprocket chains 144, extending forwardly to engage smaller sprocket wheels 145, rigidly mounted upon the transverse shaft 141. The shaft 141 carries a bevel gear 146, engaged by a bevel gear 147, carried by the power distributing shaft 38, as shown. Journaled through the end members 134 are rock-shafts 148, extending exteriorly thereof and having toothed segments 149 rigidly connected therewith, such segments being permanently substantially vertical. The toothed segments 149 are pivotally connected, as shown at 150, with a shifting ring 151, as shown. This shifting ring is eccentric with relation to the end member 134. Rigidly connected with each of the end members 134 and disposed exteriorly thereof, is an operating gear 152, which permanently engages one of the toothed segments 149, that is the toothed segment beneath it. Each segment 149 preferably has six teeth, and the gear 152 twenty-four teeth. The rock-shafts 148 have vertically arranged depending blades 153 rigidly mounted thereon, which blades extend exteriorly thereof for engagement with the ground or mud through which the machine is to be propelled. Each blade 153 carries laterally extending horizontal flanges or blades 154, preventing the wheel from entering the ground or mud beyond a predetermined distance. It is thus apparent that as the wheel is rotated the blades 153 are retained vertical, whereby the lower blade or blades engage with the ground or mud for effecting a feeding movement of the machine, and are elevated out of engagement therewith while remaining vertical. While I prefer to use this form of feed wheel, it is obvious that other means may be employed.

Connected with the outer ends of the radius arms 140 are cables 155, connected with a boom 157, pivotally connected with a mast 158. This boom is raised and lowered by a cable 159 or the like.

The operation of the machine is as follows: For the purpose of illustration, the machine will be considered as operating in marsh land, the support or boat 20 resting upon partly or wholly flooded mud or earth. The machine is found to operate more successfully upon such land, as the water prevents the mud or earth from clogging the elements of the machine, while the invention is in no sense restricted to such use. The longitudinal travel of the machine is effected by the feed wheel, receiving its rotation at a greatly reduced speed from the engine 33, through the medium of the shaft 38 and associated elements, the rotation of the shaft 38 being effected by the operation of elements to be hereinafter fully explained. This engine also drives the shaft 28, in turn rotating the shaft 21. The rotation of the shaft 21 is imparted to the pinion 80, which engages with the main gear 77 and rotates the planetary gear-carrier 67. This planetary gear-carrier is eccentric with relation to the rotatable cutter 84, and having connection therewith through the medium of the cranks 97 and associated elements, rotates the same in the direction of the arrow. During its rotation, the cutter 84 shaves or cuts the mud or earth, which passes through or between the curved spokes 85. The rearward movement of the cut or loosened mud or earth, after it has passed through the rotatable cutter 84, is expedited by blades 98 and 130 which are inclined rearwardly, at or near the bottom of the machine and parallel to the plane of rotation of the cutter, at the top thereof, as above stated. The annular take-up conveyer 112 rotates with the cutter 84 and travels rearwardly thereof in its path to gather up the cut or loosened mud or earth. As each pocket 118 is moved to the lowermost position, it is partly or wholly filled with mud or earth, which moves inwardly therein, until the pocket reaches the opening 19, its bottom then being uncovered or opened, whereby it discharges by gravity into the chute 120. The mud or earth gravitates from the chute 120 on to the conveyer 122, and is conducted thereby to a point remote from the chute. While the cutting element 84 and annular conveyer 112 are thus rotating upon their axes, the rock-shaft 34 is being slowly turned back and forth. This movement of the rock-shaft is derived from the engine 33, which drives the shaft 21, as above stated. The shaft 21 rotates sprocket wheel 66, driving sprocket chain 65, which engages and rotates sprocket wheel 64. The sprocket wheel 64, as more clearly shown in Fig. 6, rotates a small pinion 61, rotating the large pinion 59. This large pinion, through the medium of pitman 58, swings bell-crank lever 55, which in turn swings lever 47. Lever 47, through the medium of pitmen 45 and 46, and associated elements, effects a step by step turning movement of the shaft 38. This shaft effects a corresponding movement of the crank disk 37, which through the medium of pitmen 36 slowly oscillates or swings the crank 35' in opposite directions. The movement of the crank 35' effects the oscillatory movement of the rock-shaft, whereby crank 81 and support wheel 105 are transversely oscillated. As a result of this movement, the rotatable cutter 84 and annular take-up conveyer 112, while remaining concentric, are shifted transversely in opposite directions, whereby the opening being cut has a greater width than the diameter of the rotatable cutting element 84. It not infrequently happens that it is desired to cut the opening to a greater extent upon one side than the other, and this may be accomplished by swinging the crank 81 to the side upon which it is desired to increase the cut, by proper manipulation of the turn buckle 36', whereby the crank 35' is angularly adjusted with relation to the crank disk 37.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. In a machine of the character described, a support, a rock-shaft connected therewith, an eccentric element connected with the rock-shaft to turn with it, a rotatable cutting element carried by the eccentric element, means to turn the rock-shaft, a planetary gear carrier pivotally mounted upon the rock-shaft, a sun gear connected with the rock-shaft to turn therewith, planetary gears carried by the planetary gear carrier, a set of inner gears engaging the sun gear, a set of outer gears engaging the planetary gears, shafts connecting the inner and outer sets of gears, means for rotating the planetary gear carrier, and means connecting the planetary gear carrier with the rotatable cutting element.

2. In a machine of the character described, a support, an approximately horizontal rock-shaft mounted upon the support and carrying a lateral extension adapted to be shifted transversely of the support in an approximately vertical plane, a rotatable cutting element pivotally mounted upon the lateral extension, means to drive the rotatable cutting element, and means to turn the rock-shaft back and forth during the rotation of the cutting element.

3. In a machine of the character described, a support, an approximately horizontal rock-shaft mounted thereon and having a crank, a rotatable cutter pivotally connected with the crank, an eccentric element mounted upon the rock-shaft to turn therewith, a rotatable conveyer carried by the eccentric element, an operating wheel pivotally mounted upon the rock-shaft between the cutting element and the conveyer, means connecting the wheel with the rotatable cutter and the conveyer, means to drive the wheel, and means to automatically turn the rock-shaft back and forth during the rotation of the wheel.

4. In a machine of the character described, a support, a member pivotally connected therewith to swing transversely of the support in a substantially vertical plane, a cutting element adapted to rotate in a substantially vertical plane and extending transversely of the support and pivotally connected with the member, means to drive the rotatable cutting element and means to automatically move the pivoted member back and forth during the rotation of the cutting element.

5. In a machine of the character described, a support, a rock-shaft connected therewith, an eccentric element connected with the rock-shaft to turn therewith, a rotatable cutting element carried by the eccentric element, a sun gear connected with the rock-shaft, a planetary gear-carrier pivotally mounted upon the rock-shaft near the sun gear, planetary gears carried by the planetary gear-carrier, gearing connected with the planetary gear-carrier and serving to connect the sun gear and the planetary gears, means connecting the planetary gears with the rotatable cutting element, and means to rotate the planetary gear-carrier with relation to the rock-shaft.

6. In a machine of the character described, a support, a rock-shaft connected therewith, an eccentric element connected with the rock-shaft to turn with it, a rotatable cutting element carried by the eccentric element, means to turn the rock-shaft, a planetary gear-carrier pivotally mounted upon the rock-shaft, a sun gear connected with the rock-shaft to turn therewith, planetary gears carried by the planetary gear-carrier, gearing carried by the planetary gear-carrier and connecting the sun gear and the planetary gears, means connecting the planetary gears with the rotatable cutting element, an annular gear mounted upon the periphery of the planetary gear-carrier to rotate it, and a driving gear engaging the annular gear.

7. In a machine of the character described, a support, a rock-shaft connected therewith, an eccentric element connected with the rock-shaft to turn with it, means to turn the rock-shaft, a rotatable cutting element carried by the eccentric element, a planetary gear-carrier pivotally mounted upon the rock-shaft, a sun gear mounted upon the rock-shaft to turn therewith, planetary gears connected with the planetary gear-carrier, gearing connected with the planetary gear-carrier and serving to connect the sun gear and the planetary gears, cranks arranged exteriorly of the planetary gear-carrier and connected with the planetary gears, rods connected with the rotatable cutter and extending radially thereof, cross-heads slidably mounted upon the rods and connected with the cranks, and means to rotate the planetary gear-carrier with relation to the rock-shaft.

8. In a machine of the character described, a support, a rock-shaft connected therewith, an eccentric element connected with the rock-shaft to turn with it, means to turn the rock-shaft, a rotatable cutting element carried by the eccentric element, a planetary gear-carrier pivotally mounted upon the rock-shaft, a sun gear mounted upon the rock-shaft to turn therewith, planetary gears connected with the planetary gear-carrier, gearing connected with the planetary gear-carrier and serving to connect the sun gear and the planetary gears, cranks arranged exteriorly of the planetary gear-carrier and connected with the planetary gears, resilient rods having a yielding connection with the rotatable cutting element and extending approximately radially thereof, cross-heads slidably mounted upon the resilient rods, and means to rotate the planetary gear-carrier with relation to the rock-shaft.

9. In a machine of the character described, a support, an approximately vertical rotatable cutting element connected therewith, an approximately vertical rotatable take-up conveyer connected with the support and arranged rearwardly of the cutting element in substantially concentric relation thereto, means to drive the cutting element and take-up conveyer, and means to laterally shift the cutting element and take-up conveyer while retaining them in the substantially concentric relation.

10. In a machine of the character described, a support, a rock-shaft connected therewith, eccentric elements carried by the rock-shaft to turn therewith, means to turn the rock-shaft, a rotatable cutting element carried by the forward eccentric element, a rotatable take-up conveyer arranged rearwardly of the cutting element and carried by the other eccentric element, and common means to rotate the cutting element and the take-up conveyer.

11. In a machine of the character described, a support, a rock-shaft connected therewith, a plurality of eccentric elements connected with the rock-shaft to turn therewith, a rotatable cutting element carried by the forward eccentric element, a rotatable take-up conveyer carried by the other eccentric element and arranged rearwardly of the cutting element, a planetary gear-carrier rotatably mounted upon the rock-shaft between the cutting element and the take-up conveyer, a sun gear mounted upon the rock-shaft to turn therewith, planetary gears connected with the planetary gear-carrier, gearing connected with the planetary gear-carrier and serving to connect the sun gear and planetary gears, cranks arranged upon opposite sides of the planetary gear-carrier and connected with the planetary gears to turn therewith, means connecting the forward set of cranks with the rotatable cutting element, and means connecting the rear set of cranks with the rotatable conveyer.

12. In a machine of the character described, a support, a rock-shaft, an eccentric element connected therewith to turn with it, a rotatable ground treating implement carried by the eccentric element, means to rotate the ground treating implement, a second eccentric element connected with the rock-shaft to turn it, a rotatable driving member, means connecting the rotatable driving member and the second eccentric element, and means to effect a step by step rotary movement to the rotatable driving member.

13. In a machine of the character described, a support, a rock-shaft, an eccentric element connected therewith to turn with it, a rotatable ground treating implement carried by the eccentric element, means to rotate the ground treating implement, a second eccentric element connected with the rock-shaft to turn it, a rotatable driving member, a longitudinally expansible and contractible pitman having pivotal connection with the second eccentric element and the rotatable driving member, and means to rotate the driving member.

14. In a machine of the character described, a support, a rock-shaft connected therewith, an eccentric element connected with the rock-shaft to turn with it, a ground treating implement pivotally connected with the eccentric element, means to drive the ground treating implement, a second eccentric element connected with the rock-shaft to turn it, a rotatable driving member, a pitman pivotally connected with the driving member and the second named eccentric element, a toothed wheel connected with the rotatable driving member to turn it, a pivoted lever arranged near the toothed wheel, a pawl carried by the lever and engaging the toothed wheel, and means to swing the lever.

15. In a machine of the character described, a support, a rock-shaft connected therewith, an eccentric element connected with the rock-shaft to turn with it, a ground treating implement pivotally connected with the eccentric element, means to drive the ground treating implement, a second eccentric element connected with the rock-shaft to turn it, a rotatable driving member, a pitman pivotally connected with the driving member and the second named eccentric element, a toothed wheel connected with the rotatable driving member to turn it, a plurality of pivoted levers arranged near the toothed wheel, a plurality of pawls carried by the levers to engage with the toothed wheel, an operating lever pivotally mounted between its ends, pitmen pivotally connecting the ends of the operating lever and the pivoted levers arranged near the toothed wheel, and means to swing the operating lever.

16. In a machine of the character described, a support, a rock-shaft connected therewith, an eccentric element connected with the rock-shaft to turn therewith, a ground treating implement pivotally mounted upon the eccentric element, means to rotate the ground treating implement, automatic means to turn the rock-shaft in opposite directions during the rotation of the ground treating implement, and means to adjust the first named means whereby the ground treating implement is shifted laterally for a greater distance in one direction than in the other.

In testimony whereof I affix my signature in presence of two witnesses.

JAMES PARKER BOWLING.

Witnesses:
JAMES L. CRAWFORD,
B. P. FISHBURNE.

Copies of this patent may be obtained for five cents each, by addressing the "Commissioner of Patents, Washington, D. C."